(12) United States Patent
Borthakur et al.

(10) Patent No.: US 7,831,552 B2
(45) Date of Patent: Nov. 9, 2010

(54) SYSTEM AND METHOD FOR QUERYING FILE SYSTEM CONTENT

(75) Inventors: Dhrubajyoti Borthakur, San Jose, CA (US); Nur Premo, San Jose, CA (US); Joseph Pasqua, Menlo Park, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1581 days.

(21) Appl. No.: 10/862,521

(22) Filed: Jun. 7, 2004

(65) Prior Publication Data
US 2006/0004787 A1   Jan. 5, 2006

(51) Int. Cl.
*G06F 7/00* (2006.01)

(52) U.S. Cl. .................. 707/615; 707/703; 707/822

(58) Field of Classification Search .......... 707/100, 707/615, 703, 822
See application file for complete search history.

(56) References Cited

U.S. PATENT DOCUMENTS

| | | | |
|---|---|---|---|
| 5,623,657 | A | 4/1997 | Conner |
| 6,240,401 | B1 | 5/2001 | Oren et al. |
| 6,240,429 | B1 | 5/2001 | Thornton et al. |
| 6,286,013 | B1 | 9/2001 | Reynolds et al. |
| 6,389,538 | B1 | 5/2002 | Gruse et al. |
| 6,799,184 | B2 | 9/2004 | Bhatt et al. |
| 6,842,758 | B1 | 1/2005 | Bogrett |
| 6,976,241 | B2 | 12/2005 | Cruz |
| 2001/0025311 | A1 | 9/2001 | Arai et al. |
| 2002/0049731 | A1 | 4/2002 | Kotani |
| 2003/0093556 | A1* | 5/2003 | Yeung et al. ............ 709/238 |
| 2003/0151633 | A1* | 8/2003 | George et al. ............ 345/864 |
| 2003/0172368 | A1 | 9/2003 | Alumbaugh et al. |
| 2004/0002942 | A1 | 1/2004 | Pudipeddi et al. |
| 2004/0059866 | A1 | 3/2004 | Patel et al. |
| 2004/0186857 | A1 | 9/2004 | Serlet et al. |
| 2005/0015461 | A1 | 1/2005 | Richard et al. |
| 2005/0038813 | A1 | 2/2005 | Apparao et al. |
| 2005/0073982 | A1 | 4/2005 | Corneille |
| 2005/0114363 | A1 | 5/2005 | Borthakur et al. |
| 2005/0114381 | A1 | 5/2005 | Borthakur et al. |
| 2005/0114406 | A1 | 5/2005 | Borthakur et al. |
| 2005/0131955 | A1 | 6/2005 | Borthakur et al. |
| 2006/0004709 | A1 | 1/2006 | Borthakur et al. |

(Continued)

OTHER PUBLICATIONS

"The Business Rationale for Distributed (Remote) Document Capture," Verity White Paper, Oct. 2003, downloaded from http://www.cardiff.com/cms/groups/public/documents/collateral/mk0535.pdf, 12 pages.

(Continued)

*Primary Examiner*—John R. Cottingham
*Assistant Examiner*—Nirav K Khakhar
(74) *Attorney, Agent, or Firm*—Meyertons, Hood, Kivlin, Kowert & Goetzel, P.C.

(57) ABSTRACT

A system and method for querying file system content. In one embodiment, the system may include a storage device configured to store a plurality of files and a file system configured to manage access to the storage device. The file system may be further configured to perform in-band detection of a file system content access event and to responsively generate a given metadata record. The system may further include a query system configured to query the given metadata record.

21 Claims, 9 Drawing Sheets

U.S. PATENT DOCUMENTS

2006/0004759 A1    1/2006    Borthakur et al.

OTHER PUBLICATIONS

"Native XML Management With Documentum," Documentum Technical White Paper, Jul. 2003, downloaded from http://software.emc.com/collateral/content_management/documentum_family/wp_tech_xml.pdf, 15 pages.

Autonomy XML White Paper, Oct. 2003, downloaded from http://www.autonomy.com/content/downloads/White%20Papers/index.en.html, 11 pages.

Autonomy Technology White Paper, Nov. 2003, downloaded from http://www.autonomy.com/content/downloads/White%20Papers/index.en.html, 19 pages.

"DCMI Abstract Data Model," Dublin Core Metadata Initiative, Feb. 2004, downloaded from http://www.ukoln.ac.uk/metadata/dcmi/abstract-model1/2004-02-04/, 17 pages.

Staples et al., "The Fedora Project: An Open-source Digital Object Repository Management System," in D-Lib Magazine, v. 9, No. 4, Apr. 2003, downloaded from http://web.archive.org/web/20040203065018/www.dlib.org/dlib/april03/staples/04staples.html, 12 pages.

Wildermuth, "A Developer's Perspective on WinFS: Part 1," Mar. 2004, downloaded from http://web.archive.org./web/20050414063209/http://msdn.microsoft.com/data/winfs/default.aspx?pull=/library/en-us/dnwinfsta/html/winfsdevpersp.asp, 10 pages.

Transcript of Microsoft Developer Network Chat ".Net Strategy," posted Jan. 8, 2003, downloaded from http://web.archive.org/web/20030606221632/http://msdn.microsoft.com/chats/vstudio/vstudio_121802.asp, 7 pages.

* cited by examiner

SYSTEM AND METHOD FOR QUERYING FILE SYSTEM CONTENT

BACKGROUND

1. Field of the Invention

This invention relates to computer systems and, more particularly, to file-based storage systems.

2. Description of the Related Art

Computer systems often process large quantities of information, including application data and executable code configured to process such data. In numerous embodiments, computer systems provide various types of mass storage devices configured to store data, such as magnetic and optical disk drives, tape drives, etc. To provide a regular and systematic interface through which to access their stored data, such storage devices are frequently organized into hierarchies of files by software such as an operating system. Often a file defines a minimum level of data granularity that a user can manipulate within a storage device, although various applications and operating system processes may operate on data within a file at a lower level of granularity than the entire file.

In some file-based computer systems, various types of information about files, also referred to as metadata, may be stored in addition to the files themselves. However, in typical conventional computer systems, support for metadata is limited to a small number of fixed types of file attributes that may not be augmented if additional file information is desired. Further, the procedure for accessing metadata may be limited to identifying a given file and then retrieving its associated metadata, rather than a more flexible procedure.

Additionally, in complex computing environments, numerous applications may be provided, each of which may interact with files and storage devices to perform specific functions. In some cases, each of several applications may be configured to perform a particular step of a complex, multi-step transaction. However, such applications may have limited ability to interact or coordinate with one another, which may require a considerable degree of intervention on the part of a system user to coordinate transaction processing.

SUMMARY

Various embodiments of a system and method for querying file system content are disclosed. In one embodiment, the system may include a storage device configured to store a plurality of files, and a file system configured to manage access to the storage device. The file system may be further configured to perform in-band detection of a file system content access event and to responsively generate a given metadata record. The system may further include a query system configured to query the given metadata record.

In one specific implementation of the system, the query system may be further configured to query file data stored in one or more of the plurality of files. In another specific implementation of the system, the file system may be further configured to generate an event record in response to in-band detection of the file system content access event, and the query system may be further configured to query the event record.

A method is also contemplated which, in one embodiment, may include storing file system content, performing in-band detection of a file system content access event, generating a given metadata record in response to performing in-band detection of the access event, and querying the given metadata record.

Figure 1:
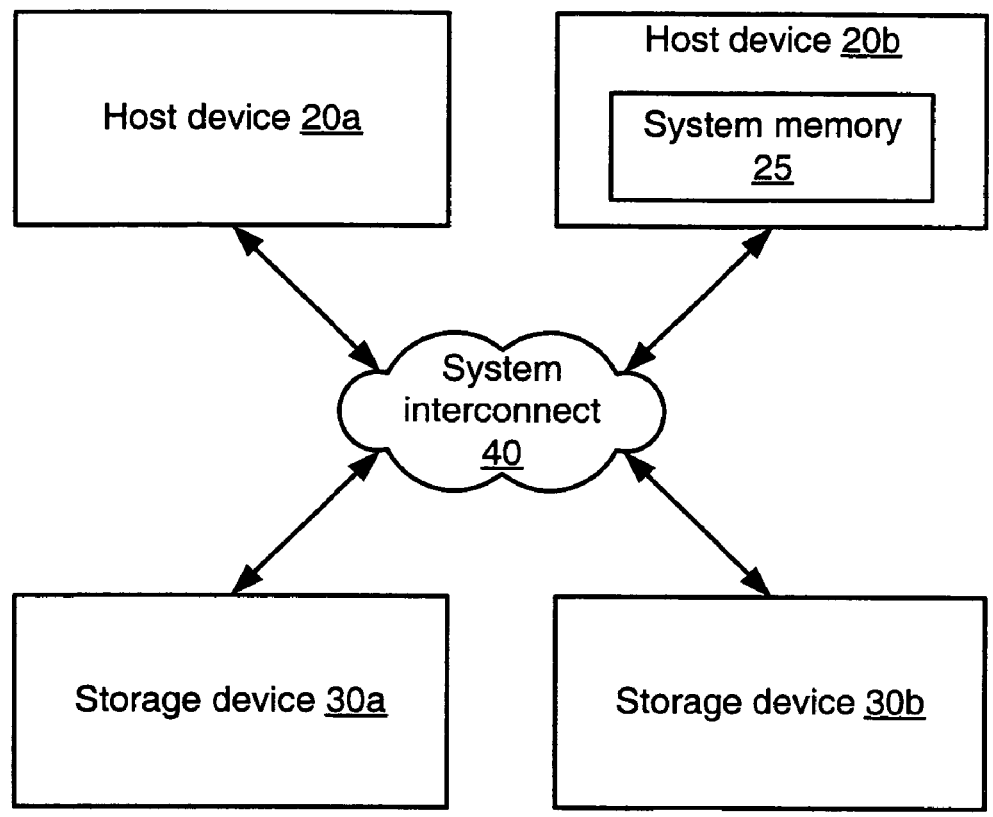
FIG. 1 is a block diagram illustrating one embodiment of a storage system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Computer System Overview

Turning now to FIG. 1, a block diagram of one embodiment of a computer system is shown. In the illustrated embodiment, system 10 includes a plurality of host devices 20a and 20b coupled to a plurality of storage devices 30a and 30b via a system interconnect 40. Further, host device 20b includes a system memory 25 in the illustrated embodiment. For simplicity of reference, elements referred to herein by a reference number followed by a letter may be referred to collectively by the reference number alone. For example, host devices 20a and 20b and storage devices 30a and 30b may be referred to collectively as host devices 20 and storage devices 30.

In various embodiments of system 10, host devices 20 may be configured to access data stored on one or more of storage devices 30. In one embodiment, system 10 may be implemented within a single computer system, for example as an integrated storage server. In such an embodiment, for example, host devices 20 may be individual processors, system memory 25 may be a cache memory such as a static RAM (SRAM), storage devices 30 may be mass storage devices such as hard disk drives or other writable or rewritable media, and system interconnect 40 may include a peripheral bus interconnect such as a Peripheral Component Interface (PCI) bus. In some such embodiments, system interconnect 40 may include several types of interconnect between host devices 20 and storage devices 30. For example, system interconnect 40 may include one or more processor buses (not shown) configured for coupling to host devices 20, one or more bus bridges (not shown) configured to couple the processor buses to one or more peripheral buses, and one or more storage device interfaces (not shown) configured to couple the peripheral buses to storage devices 30. Storage device interface types may in various embodiments include the Small Computer System Interface (SCSI), AT Attachment Packet Interface (ATAPI), Firewire, and/or Universal Serial Bus (USB), for example, although numerous alternative embodiments including other interface types are possible and contemplated.

In an embodiment of system 10 implemented within a single computer system, system 10 may be configured to provide most of the data storage requirements for one or more other computer systems (not shown), and may be configured to communicate with such other computer systems. In an alternative embodiment, system 10 may be configured as a distributed storage system, such as a storage area network (SAN), for example. In such an embodiment, for example, host devices 20 may be individual computer systems such as server systems, system memory 25 may be comprised of one or more types of dynamic RAM (DRAM), storage devices 30 may be standalone storage nodes each including one or more hard disk drives or other types of storage, and system interconnect 40 may be a communication network such as Ethernet or Fibre Channel. A distributed storage configuration of system 10 may facilitate scaling of storage system capacity as well as data bandwidth between host and storage devices.

In still another embodiment, system 10 may be configured as a hybrid storage system, where some storage devices 30 are integrated within the same computer system as some host devices 20, while other storage devices 30 are configured as standalone devices coupled across a network to other host devices 20. In such a hybrid storage system, system interconnect 40 may encompass a variety of interconnect mechanisms, such as the peripheral bus and network interconnect described above.

It is noted that although two host devices 20 and two storage devices 30 are illustrated in FIG. 1, it is contemplated that system 10 may have an arbitrary number of each of these types of devices in alternative embodiments. Also, in some embodiments of system 10, more than one instance of system memory 25 may be employed, for example in other host devices 20 or storage devices 30. Further, in some embodiments, a given system memory 25 may reside externally to host devices 20 and storage devices 30 and may be coupled directly to a given host device 20 or storage device 30 or indirectly through system interconnect 40.

In many embodiments of system 10, one or more host devices 20 may be configured to execute program instructions and to reference data, thereby performing a computational function. In some embodiments, system memory 25 may be one embodiment of a computer-accessible medium configured to store such program instructions and data. However, in other embodiments, program instructions and/or data may be received, sent or stored upon different types of computer-accessible media. Generally speaking, a computer-accessible medium may include storage media or memory media such as magnetic or optical media, e.g., disk or CD-ROM included in system 10 as storage devices 30. A computer-accessible medium may also include volatile or non-volatile media such as RAM (e.g. SDRAM, DDR SDRAM, RDRAM, SRAM, etc.), ROM, etc, that may be included in some embodiments of system 10 as system memory 25. Further, a computer-accessible medium may include transmission media or signals such as electrical, electromagnetic, or digital signals, conveyed via a communication medium such as network and/or a wireless link, which may be included in some embodiments of system 10 as system interconnect 40.

In some embodiments, program instructions and data stored within a computer-accessible medium as described above may implement an operating system that may in turn provide an environment for execution of various application programs. For example, a given host device 20 may be configured to execute a version of the Microsoft Windows operating system, the Unix/Linux operating system, the Apple Macintosh operating system, or another suitable operating system. Additionally, a given host device may be configured to execute application programs such as word processors, web browsers and/or servers, email clients and/or servers, and multimedia applications, among many other possible applications.

Figure 2:
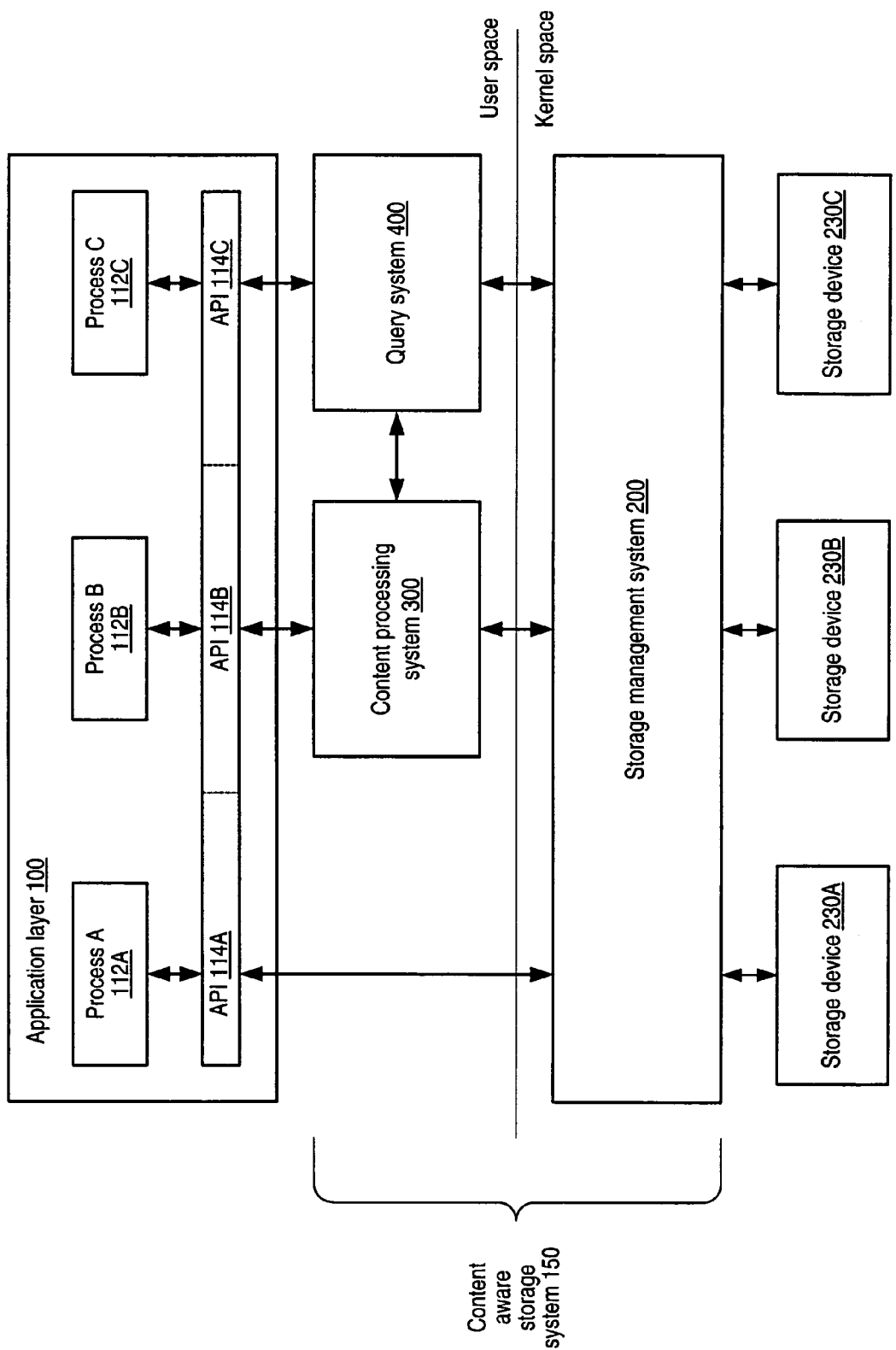
FIG. 2 is a block diagram illustrating one embodiment of a software-based storage system architecture and its interface to storage devices.

During execution on a given host device 20, either the operating system or a given application may generate requests for data to be loaded from or stored to a given storage device 30. For example, code corresponding to portions of the operating system or an application itself may be stored on a given storage device 30, so in response to invocation of the desired operation system routine or application program, the corresponding code may be retrieved for execution. Similarly, operating system or application execution may produce data to be stored In some embodiments, the movement and processing of data stored on storage devices 30 may be managed by a software-based storage system. One such embodiment is illustrated in FIG. 2, which shows an application layer 100 interfacing to a plurality of storage devices 230A-C via a content aware storage system 150. Some modules illustrated within FIG. 2 may be configured to execute in a user execution mode or "user space", while others may be configured to execute in a kernel execution mode or "kernel space." In the illustrated embodiment, application layer 100 includes a plurality of user space software processes 112A-C. Each process interfaces to storage system 150 via a plurality of application programming interfaces (APIs) 114A-C, such that each of processes 112 may have access to each of APIs 114A-C. Storage system 150 includes a kernel space storage management system 200, shown interfacing to application layer 100 via API 114A; a user space content processing system 300, shown interfacing to application layer 100 via API 114B; and a user space query system 400, shown interfacing to application layer 100 via API 114C. In the illustrated embodiment, storage management system 200 further interfaces to storage devices 230A-C.

It is contemplated that in some embodiments, an arbitrary number of processes 112 and/or storage devices 230 may be implemented. It is further contemplated that in some embodiments, all or portions of content processing system 300 and/or query system 400 may be implemented in kernel space, and that in some embodiments, processes configured to execute in kernel space may be configured to access storage system 150 via APIs 114 or other APIs specific to kernel space processes.

In one embodiment, each of processes 112 may correspond to a given user application, and each may be configured to access storage devices 230A-C through calls to APIs 114. APIs 114 provide processes 112 with access to various components of storage system 150. For example, in one embodiment APIs 114 may include function calls exposed by storage system 150 that a given process 112 may invoke, while in other embodiments API 114 may support other types of inter-process communication. In one embodiment, storage devices 230 may be illustrative of storage devices 30 of FIG. 1. Additionally, in one embodiment, any of the components of storage system 150 and/or any of processes 112 may be configured to execute on one or more host devices 20 of FIG. 1, for example as program instructions and data stored within a computer-accessible medium such as system memory 25 of FIG. 1.

As described in greater detail below in conjunction with the descriptions of FIG. 3 through 9, storage system 150 may be configured to provide a variety of storage-related services. For example, in one embodiment storage management system 200 may be configured to organize the data stored by storage devices 230 using a file system, such that various processes 112 may store and manipulate data as hierarchical files. Additionally, storage system 150 may be configured to monitor operations to access and/or manipulate stored data and to generate records of such operations. Query system 400 may be configured to provide processes 112 with an interface through which to query the data stored by storage devices 230 as well as records of operations to access such data. Finally, content processing system 300 may be configured to monitor the activity of storage management system 200 and to create additional records of such activity. As described in greater detail below, content processing system 300 may further be configured to invoke one or more applications in response to detecting such activity, thereby providing a mechanism for initiating content processing activity based on activity of storage management system 200 rather than directly on the activity of application layer 100 (e.g., on data requests by processes 112). It is contemplated that in some embodiments of storage system 150, content processing system 300, query system 400, or both systems may be omitted while the services provided by storage management system 200 may be retained.

Storage Management System and File System

As just noted, in some embodiments storage management system 200 may provide data and control structures for organizing the storage space provided by storage devices 230 into files. In various embodiments, the data structures may include one or more tables configured to store information such as, for example, the identity of each file, its location within storage devices 230 (e.g., a mapping to a particular physical location within a particular storage device), as well as other information about each file as described in greater detail below. Also, in various embodiments, the control structures may include executable routines for manipulating files, such as, for example, function calls for changing file identities and for modifying file content. Collectively, these data and control structures may be referred to herein as a file system, and the particular data formats and protocols implemented by a given file system may be referred to herein as the format of the file system.

In some embodiments, a file system may be integrated into an operating system such that any access to data stored on storage devices 230 is governed by the control and data structures of the file system. Different operating systems may implement different native file systems using different formats, but in some embodiments, a given operating system may include a file system that supports multiple different types of file system formats, including file system formats native to other operating systems. In such embodiments, the various file system formats supported by the file system may be referred to herein as local file systems. Additionally, in some embodiments, a file system may be implemented using multiple layers of functionality arranged in a hierarchy, as illustrated in FIG. 3.

Figure 3:
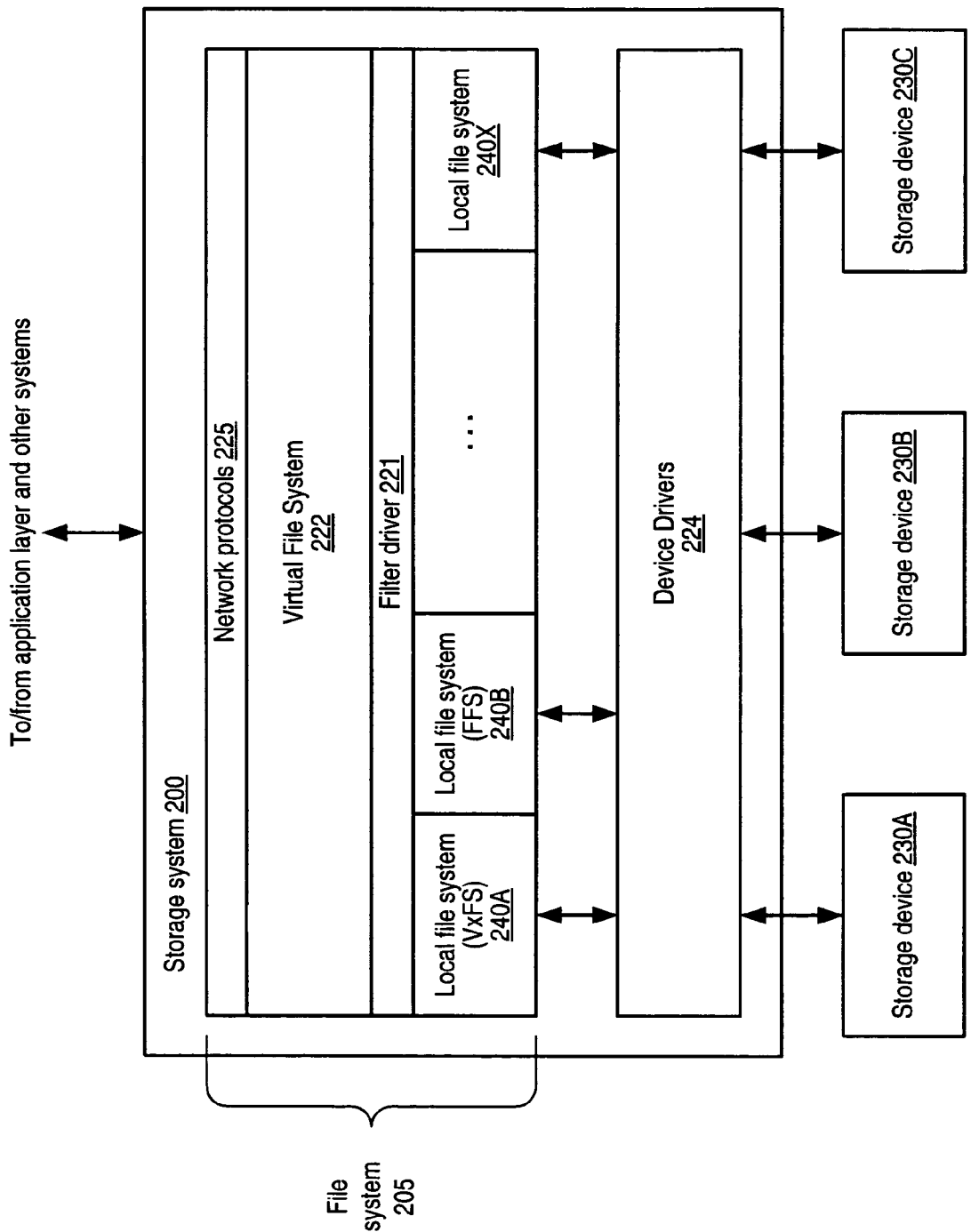
FIG. 3 is a block diagram illustrating one embodiment of a storage management system.

FIG. 3 illustrates one embodiment of storage management system 200. In the illustrated embodiment, storage management system includes a file system 205 configured to interface with one or more device drivers 224, which are in turn configured to interface with storage devices 230. As illustrated within storage system 150 of FIG. 2, the components of storage management system 200 may be configured to execute in kernel space; however, it is contemplated that in some embodiments, some components of storage management system 200 may be configured to execute in user space. Also, in one embodiment, any of the components of storage management system 200 may be configured to execute on one or more host devices 20 of FIG. 1, for example as program instructions and data stored within a computer-accessible medium such as system memory 25 of FIG. 1.

As described above with respect to system 10 of FIG. 1, a given host device 20 may reside in a different computer system from a given storage device 30, and may access that storage device via a network. Likewise, with respect to storage management system 200, in one embodiment a given process such as process 112A may execute remotely and may access storage devices 230 over a network. In the illustrated embodiment, file system 205 includes network protocols 225 to support access to the file system by remote processes. In some embodiments, network protocols 225 may include support for the Network File System (NFS) protocol or the Common Internet File System (CIFS) protocol, for example, although it is contemplated that any suitable network protocol may be employed, and that multiple such protocols may be supported in some embodiments.

File system 205 may be configured to support a plurality of local file systems. In the illustrated embodiment, file system 205 includes a VERITAS (VxFS) format local file system 240A, a Berkeley fast file system (FFS) format local file system 240B, and a proprietary (X) format local file system 240X. However, it is contemplated that in other embodiments, any number or combination of local file system formats may be supported by file system 205. To provide a common interface to the various local file systems 240, file system 205 includes a virtual file system 222. In one embodiment, virtual file system 222 may be configured to translate file system operations originating from processes 112 to a format applicable to the particular local file system 240 targeted by each operation. Additionally, in the illustrated embodiment storage management system 200 includes device drivers 224 through which local file systems 240 may access storage devices 230. Device drivers 224 may implement data transfer protocols specific to the types of interfaces employed by storage devices 230. For example, in one embodiment device drivers 224 may provide support for transferring data across SCSI and ATAPI interfaces, though in other embodiments device drivers 224 may support other types and combinations of interfaces.

In the illustrated embodiment, file system 205 also includes filter driver 221. In some embodiments, filter driver 221 may be configured to monitor each operation entering file system 205 and, subsequent to detecting particular types of operations, to cause additional operations to be performed or to alter the behavior of the detected operation. For example, in one embodiment filter driver 221 may be configured to combine multiple write operations into a single write operation to improve file system performance. In another embodiment, filter driver 221 may be configured to compute a signature of a file subsequent to detecting a write to that file. In still another embodiment, filter driver 221 may be configured to store information, such as records, associated with particular files subsequent to detecting certain kinds of operations on those files, as described in greater detail below. It is contemplated that in some embodiments, filter driver 221 may be configured to implement one or more combinations of the aforementioned operations, including other filter operations not specifically mentioned.

An embodiment of filter driver 221 that is configured to detect file system operations as they are requested or processed may be said to perform "in-band" detection of such operations. Alternatively, such detection may be referred to as being synchronous with respect to occurrence of the detected operation or event. In some embodiments, a processing action taken in response to in-band detection of an operation may affect how the operation is completed. For example, in-band detection of a file read operation might result in cancellation of the operation if the source of the operation is not sufficiently privileged to access the requested file. In some embodiments, in-band detection of an operation may not lead to any effect on the completion of the operation itself, but may spawn an additional operation, such as to record the occurrence of the detected operation in a metadata record as described below.

By contrast, a file system operation or event may be detected subsequent to its occurrence, such that detection may occur after the operation or event has already completed. Such detection may be referred to as "out of band" or asynchronous with respect to the detected operation or event. For example, a user process 112 may periodically check a file to determine its length. The file length may have changed at any time since the last check by user process 112, but the check may be out of band with respect to the operation that changed the file length. In some instances, it is possible for out of band detection to fail to detect certain events. Referring to the previous example, the file length may have changed several times since the last check by user process 112, but only the last change may be detected.

It is noted that although an operation or event may be detected in-band, an action taken in response to such detection may occur either before or after the detected operation completes. Referring to the previous example, in one embodiment each operation to modify the length of the checked file may be detected in-band and recorded. User process 112 may be configured to periodically inspect the records to determine the file length. Because length-modifying operations were detected and recorded in-band, user process 112 may take each such operation into account, even though it may be doing so well after the occurrence of these operations.

It is noted that filter driver 221 is part of file system 205 and not an application or process within user space 210. Consequently, filter driver 221 may be configured to operate independently of applications and processes within the user space 210. Alternatively, or in addition to the above, filter driver 221 may be configured to perform operations in response to requests received from applications or processes within the user space 210.

It is further noted that in some embodiments, kernel space 220 may include processes (not shown) that generate accesses to storage devices 230, similar to user space processes 112. In such embodiments, processes executing in kernel space 220 may be configured to access file system 205 through a kernel-mode API (not shown), in a manner similar to user space processes 112. Thus, in some embodiments, all accesses to storage devices 230 may be processed by file system 205, regardless of the type or space of the process originating the access operation.

Numerous alternative embodiments of storage management system 200 and file system 205 are possible and contemplated. For example, file system 205 may support different numbers and formats of local file systems 240, or only a single local file system 240. In some embodiments, network protocol 225 may be omitted or integrated into a portion of storage management system 200 external to file system 205. Likewise, in some embodiments virtual file system 222 may be omitted or disabled, for example if only a single local file system 240 is in use. Additionally, in some embodiments filter driver 221 may be implemented within a different layer of file system 205. For example, in one embodiment, filter driver 221 may be integrated into virtual file system 222, while in another embodiment, an instance of filter driver 221 may be implemented in each of local file systems 240.

Files and Metadata

As described above, file system 205 may be configured to manage access to a plurality of files stored on storage devices 230. In many embodiments, each stored file may have an associated identity used by the file system to distinguish each file from other files. In one embodiment of file system 205, the identity of a file may be a file name, which may for example include a string of characters such as "filename.txt". However, in embodiments of file system 205 that implement a file hierarchy, such as a hierarchy of folders or directories, all or part of the file hierarchy may be included in the file identity. For example, a given file named "file1.txt" may reside in a directory "smith" that in turn resides in a directory "users". The directory "users" may reside in a directory "test1" that is a top-level or root-level directory within file system 205. In some embodiments, file system 205 may define a single "root directory" to include all root-level directories, where no higher-level directory includes the root directory. In other embodiments, multiple top-level directories may coexist such that no higher-level directory includes any top-level directory. The names of the specific folders or directories in which a given file is located may be referred to herein as the given file's path or path name.

In some embodiments of file system 205 that implement a file hierarchy, a given file's identity may be specified by listing each directory in the path of the file as well as the file name. Referring to the example given above, the identity of the given instance of the file named "file1.txt" may be specified as "/test1/users/smith/file1.txt". It is noted that in some embodiments of file system 205, a file name alone may be insufficient to uniquely identify a given file, whereas a fully specified file identity including path information may be sufficient to uniquely identify a given file. There may, for example, exist a file identified as "/test2/users/smith/file1.txt" that, despite sharing the same file name as the previously mentioned file, is distinct by virtue of its path. It is noted that other methods of representing a given file identity using path and file name information are possible and contemplated. For example, different characters may be used to delimit directory/folder names and file names, or the directory/folder names and file names may be specified in a different order.

The files managed by file system 205 may store application data or program information, which may collectively be referred to as file data, in any of a number of encoding formats. For example, a given file may store plain text in an ASCII-encoded format or data in a proprietary application format, such as a particular word processor or spreadsheet encoding format. Additionally, a given file may store video or audio data or executable program instructions in a binary format. It is contemplated that numerous other types of data and encoding formats, as well as combinations of data and encoding formats, may be used in files as file data.

In addition to managing access to storage devices, the various files stored on storage devices, and the file data in those files as described above, in some embodiments file system 205 may be configured to store information corresponding to one or more given files, which information may be referred to herein as metadata. Generally speaking, metadata may encompass any type of information associated with a file. In various embodiments, metadata may include information such as (but not limited to) the file identity, size, ownership, and file access permissions. Metadata may also include free-form or user-defined data such as records corresponding to file system operations, as described in greater detail below. In some embodiments, the information included in metadata may be predefined (i.e., hardcoded) into file system 205, for example as a collection of metadata types defined by a vendor or integrator of file system 205. In other embodiments, file system 205 may be configured to generate new types of metadata definitions during operation. In still other embodiments, one or more application processes 112 external to file system 205 may define new metadata to be managed by file system 205, for example via an instance of API 114 defined for that purpose. It is contemplated that combinations of such techniques of defining metadata may be employed in some embodiments. Metadata corresponding to a file, however defined, as well as the data content of files may collectively be referred to herein as file system content.

Figure 4:
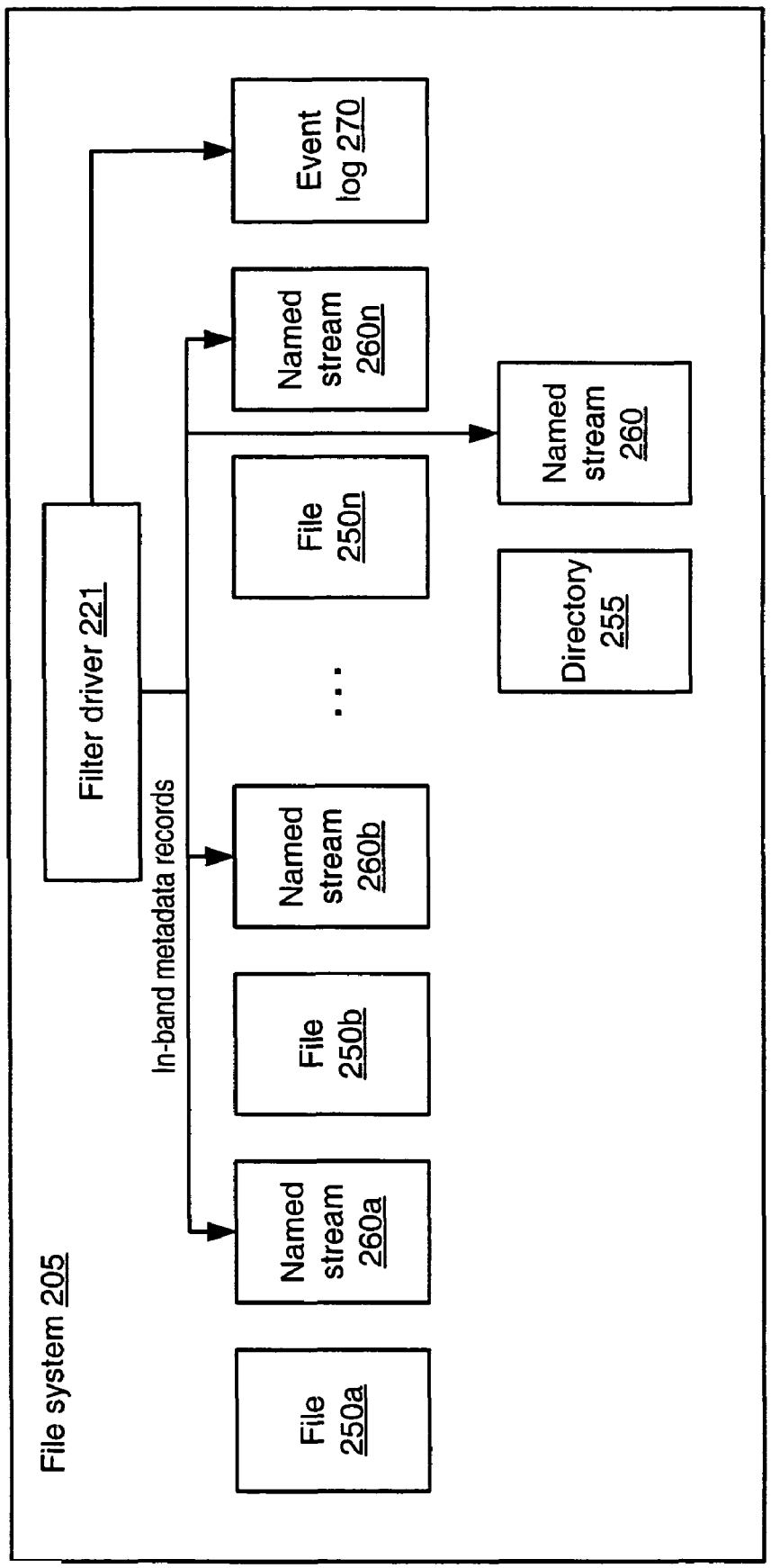
FIG. 4 is a block diagram illustrating one embodiment of a file system configured to store files and associated metadata.

FIG. 4 illustrates one embodiment of a file system configured to store files and associated metadata. The embodiment of file system 205 shown in FIG. 4 may include those elements illustrated in the embodiment of FIG. 3; however, for sake of clarity, some of these elements are not shown. In the illustrated embodiment, file system 205 includes filter driver 221, an arbitrary number of files 250a-n, a directory 255, a respective named stream 260a-n associated with each of files 250a-n, a respective named stream 260 associated with directory 255, and an event log 270. It is noted that a generic instance of one of files 250a-n or named streams 260a-n may be referred to respectively as a file 250 or a named stream 260, and that files 250a-n and named streams 260a-n may be referred to collectively as files 250 and named streams 260, respectively. As noted above, files 250 and named streams 260 may collectively be referred to as file system content. In some embodiments, directory 255 may also be included in file system content.

Files 250 may be representative of files managed by file system 205, and may in various embodiments be configured to store various types of data and program instructions as described above. In hierarchical implementations of file system 205, one or more files 250 may be included in a directory 255 (which may also be referred to as a folder). In various embodiments, an arbitrary number of directories 255 may be provided, and some directories 255 may be configured to hierarchically include other directories 255 as well as files 250. In the illustrated embodiment, each of files 250 and directory 255 has a corresponding named stream 260. Each of named streams 260 may be configured to store metadata pertaining to its corresponding file. It is noted that files 250, directory 255 and named streams 260 may be physically stored on one or more storage devices, such as storage devices 230 of FIG. 2. However, for purposes of illustration, files 250, directory 255 and named streams 260 are shown as conceptually residing within file system 205. Also, it is contemplated that in some embodiments directory 255 may be analogous to files 250 from the perspective of metadata generation, and it is understood that in such embodiments, references to files 250 in the following discussion may also apply to directory 255.

In some embodiments, filter driver 221 may be configured to access file data stored in a given file 250. For example, filter driver 221 may be configured to detect read and/or write operations received by file system 205, and may responsively cause file data to be read from or written to a given file 250 corresponding to the received operation. In some embodiments, filter driver 221 may be configured to generate in-band metadata corresponding to a given file 250 and store the generated metadata in the corresponding named stream 260.

For example, upon detecting a file write operation directed to given file 250, filter driver 221 may be configured to update metadata corresponding to the last modified time of given file 250 and to store the updated metadata within named stream 260. Also, in some embodiments filter driver 221 may be configured to retrieve metadata corresponding to a specified file on behalf of a particular application.

Metadata may be generated in response to various types of file system activity initiated by processes 112 of FIG. 2. In some embodiments, the generated metadata may include records of arbitrary complexity. For example, in one embodiment filter driver 221 may be configured to detect various types of file manipulation operations such as file create, delete, rename, and/or copy operations as well as file read and write operations. In some embodiments, such operations may be detected in-band as described above. After detecting a particular file operation, filter driver 221 may be configured to generate a record of the operation and store the record in the appropriate named stream 260 as metadata of the file 250 targeted by the operation.

More generally, any operation that accesses any aspect of file system content, such as reading or writing of file data or metadata, may be referred to as a file system content access event. In one embodiment, filter driver 221 may be configured to generate a metadata record in response to detecting a file system content access event. It is contemplated that in some embodiments, access events targeting metadata may themselves generate additional metadata. As described in greater detail below, in the illustrated embodiment, event log 270 may be configured to store records of detected file system content access events independently of whether additional metadata is stored in a particular named stream 260 in response to event detection.

The stored metadata record may in various embodiments include various kinds of information about the file 250 and the operation detected, such as the identity of the process generating the operation, file identity, file type, file size, file owner, and/or file permissions, for example. In one embodiment, the record may include a file signature indicative of the content of file 250. A file signature may be a hash-type function of all or a portion of the file contents and may have the property that minor differences in file content yield quantifiably distinct file signatures. For example, the file signature may employ the Message Digest 5 (MD5) algorithm, which may yield different signatures for files differing in content by as little as a single bit, although it is contemplated that any suitable signature-generating algorithm may be employed. The record may also include additional information not specifically listed.

In one embodiment, the metadata record stored by filter driver 221 subsequent to detecting a particular file operation may be generated and stored in a format that may include data fields along with tags that describe the significance of an associated data field. Such a format may be referred to as a "self-describing" data format. For example, a data element within a metadata record may be delimited by such tag fields, with the generic syntax:

<descriptive_tag>data element</descriptive_tag> where the "descriptive_tag" delimiter may describe some aspect of the "data element" field, and may thereby serve to structure the various data elements within a metadata record. It is contemplated that in various embodiments, self-describing data formats may employ any of a variety of syntaxes, which may include different conventions for distinguishing tags from data elements.

Self-describing data formats may also be extensible, in some embodiments. That is, the data format may be extended to encompass additional structural elements as required. For example, a non-extensible format may specify a fixed structure to which data elements must conform, such as a tabular row-and-column data format or a format in which the number and kind of tag fields is fixed. By contrast, in one embodiment, an extensible, self-describing data format may allow for an arbitrary number of arbitrarily defined tag fields used to delimit and structure data. In another embodiment, an extensible, self-describing data format may allow for modification of the syntax used to specify a given data element. In some embodiments, an extensible, self-describing data format may be extended by a user or an application while the data is being generated or used.

In one embodiment, Extensible Markup Language (XML) format, or any data format compliant with any version of XML, may be used as an extensible, self-describing format for storing metadata records, although it is contemplated that in other embodiments, any suitable format may be used, including formats that are not extensible or self-describing. XML-format records may allow arbitrary definition of record fields, according to the desired metadata to be recorded. One example of an XML-format record is as follows:

```
<record sequence="1">
    <path>/test1/foo.pdf</path>
    <type>application/pdf</type>
    <user id=1598>username</user>
    <group id=119>groupname</group>
    <perm>rw-r--r--</perm>
    <md5>d41d8cd98f00b204e9800998ecf8427e</md5>
    <size>0</size>
</record>
```

Such a record may be appended to the named stream (for example, named stream 260a) associated with the file (for example, file 250a) having the file identity "/test1/foo.pdf" subsequent to, for example, a file create operation. In this case, the number associated with the "record sequence" field indicates that this record is the first record associated with file 250a. The "path" field includes the file identity, and the "type" field indicates the file type, which in one embodiment may be provided by the process issuing the file create operation, and in other embodiments may be determined from the extension of the file name or from header information within the file, for example. The "user id" field records both the numerical user id and the textual user name of the user associated with the process issuing the file create operation, and the "group id" field records both the numerical group id and the textual group name of that user. The "perm" field records file permissions associated with file 250a in a format specific to the file system 205 and/or the operating system. The "md5" field records an MD5 signature corresponding to the file contents, and the "size" field records the length of file 250a in bytes. It is contemplated that in alternative embodiments, filter driver 221 may store records corresponding to detected operations where the records include more or fewer fields, as well as fields having different definitions and content. It is also contemplated that in some embodiments filter driver 221 may encapsulate data read from a given file 250 within the XML format, such that read operations to files may return XML data regardless of the underlying file data format. Likewise, in some embodiments filter driver 221 may be configured to receive XML format data to be written to a given file 250. In such an embodiment, filter driver 221 may be configured to remove XML formatting prior to writing the file data to given file 250.

It is noted that in some embodiments, metadata may be stored in a structure other than a named stream. For example, in one embodiment metadata corresponding to one or more files may be stored in another file in a database format or another format. Also, it is contemplated that in some embodiments, other software modules or components of file system 205 may be configured to generate, store, and/or retrieve metadata. For example, the metadata function of filter driver 221 may be incorporated into or duplicated by another software module.

In the illustrated embodiment, file system 205 includes event log 270. Event log 270 may be a named stream similar to named streams 260; however, rather than being associated with a particular file, event log 270 may be associated directly with file system 205. In some embodiments, file system 205 may include only one event log 270, while in other embodiments, more than one event log 270 may be provided. For example, in one embodiment of file system 205 including a plurality of local file systems 240 as illustrated in FIG. 2, one history stream per local file system 240 may be provided.

In some embodiments, filter driver 221 may be configured to store a metadata record in event log 270 in response to detecting a file system operation or event. For example, a read or write operation directed to a particular file 250 may be detected, and subsequently filter driver 221 may store a record indicative of the operation in event log 270. In some embodiments, filter driver 221 may be configured to store metadata records within event log 270 regardless of whether a corresponding metadata record was also stored within a named stream 260. In some embodiments event log 270 may function as a centralized history of all detected operations and events transpiring within file system 205.

Similar to the records stored within named stream 260, the record stored by filter driver 221 in event log 270 may in one embodiment be generated in an extensible, self-describing data format such as the Extensible Markup Language (XML) format, although it is contemplated that in other embodiments, any suitable format may be used. As an example, a given file 250a named "/test1/foo.pdf" may be created, modified, and then renamed to file 250b "/test1/destination.pdf" in the course of operation of file system 205. In one embodiment, event log 270 may include the following example records subsequent to the rename operation:

```
<record>
    <op>create</op>
    <path>/test1/foo.pdf</path>
</record>
<record>
    <op>modify</op>
    <path>/test1/foo.pdf</path>
</record>
<record>
    <op>rename</op>
    <path>/test1/destination.pdf</path>
    <oldpath>/test1/foo.pdf</oldpath>
</record>
```

In this example, the "op" field of each record indicates the operation performed, while the "path" field indicates the file identity of the file 250a operated on. In the case of the file rename operation, the "path" field indicates the file identity of the destination file 250b of the rename operation, and the "oldpath" field indicates the file identity of the source file 250a. It is contemplated that in alternative embodiments, filter driver 221 may store within event log 270 records including more or fewer fields, as well as fields having different definitions and content.

Figure 5:
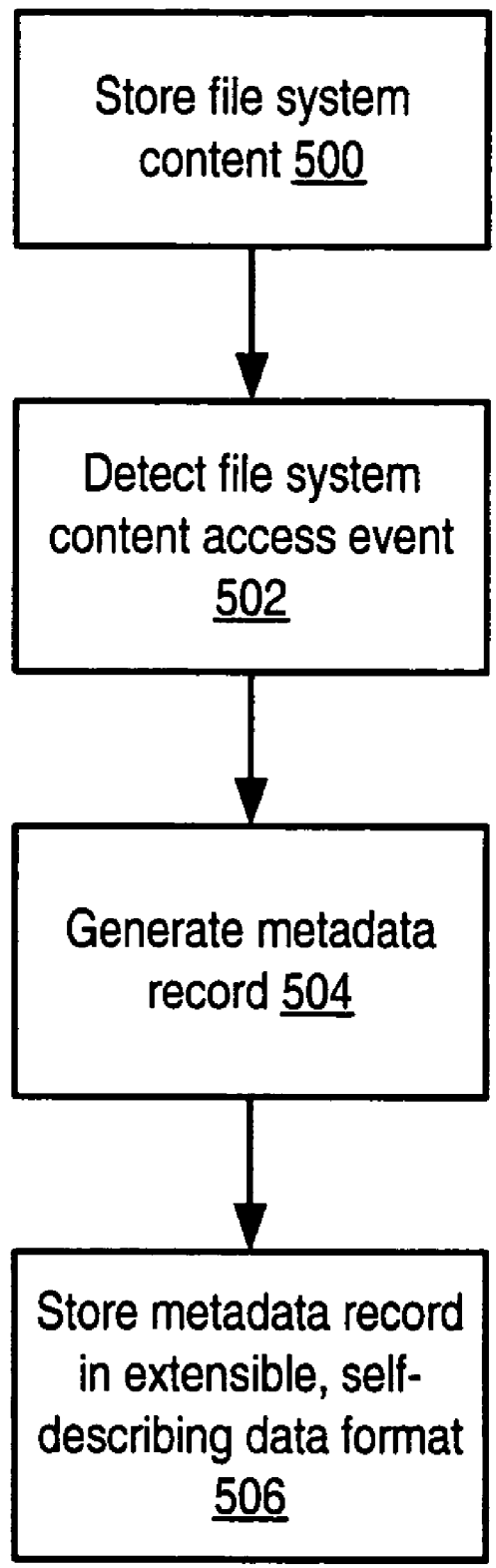
FIG. 5 is a flow diagram illustrating one embodiment of a method of metadata generation.

The foregoing discussion of metadata generation is illustrated more generally in the flow chart shown in FIG. 5. Referring collectively to FIG. 1 through FIG. 5, operation begins in block 500 where file system content, such as file data or metadata, is stored. In one embodiment, file system content may include both file data and metadata. Subsequent to storing file system content, a file system content access event is detected (block 502). In one embodiment, the file system content access event may be detected in-band, for example by filter driver 221 as described above. It is noted that in some embodiments, the initial storing of file system content may itself be a detectable file system content access event. For example, a file create operation may be a file system content access event detectable in step 502.

In response to detection of the file system content access event, a metadata record is generated (block 504). For example, various metadata elements pertinent to an operation to access a given file may be assembled, such as the file identity, file ownership, the identity of the process generating the access event, etc.

Subsequent to generation of the metadata record, the metadata record is stored in an extensible, self-describing data format (block 506). In one embodiment, the data format may be compliant with a version of the XML format. In various embodiments, the metadata record may be stored in a named stream associated with a given file, such as one of named streams 260, or in an event log such as event log 270.

Content Processing System

As just described, in some embodiments a storage system may be configured to generate in-band metadata in response to various detected file system operations or events. Such operations or events may arise, in some instances, as the result of the execution of various application processes. For example, a given application may cause a file to be manipulated in any of various ways (such as opening, closing, reading, writing, copying, renaming, or any other type of file activity) for which a corresponding metadata record may be generated. In such embodiments, the resulting metadata records may enable the systematic tracking of file system activity generated by a given application or process, where such tracking may be performed to an arbitrary degree of specificity and may be transparent to the application.

In some instances, numerous applications may interact with storage system 150 as part of a complex, heterogeneous data processing system. For example, an enterprise may use a database application to manage inventory and production, an accounting application to track billing and receipts, a finance application to generate quarterly reporting, and a human resources application to identify personnel details. Additional or different applications may be provided in various embodiments.

Some of these applications may be versions of the same application (for example, accounting and finance may use common or related applications), or they may be tightly coupled applications, i.e., they may be substantially aware of each other's presence and data, such as by sharing a common API through which they may directly communicate and coordinate. For example, upon processing a bill, the accounting application may directly notify the finance application to update a budget. Other applications may be provided by different vendors and may be only loosely coupled, i.e., they may share a common data format, but may possess limited ability to directly communicate and coordinate each other's operation. For example, the finance application may be capable of importing salary and benefits information generated by the human resources application in response to a user's intervention, but may not be capable of directly requesting and receiving that information without some such intervention. Finally, in some cases, certain applications may be entirely incompatible, lacking the ability either to share data or directly interact.

Certain complex enterprise operations may involve not just one, but several applications, not all of which may be tightly coupled to one another. Such operations, which may be referred to as transactions, may include a series of operations to be undertaken by one or more applications in a particular order or in response to a particular event. The series of operations comprising a transaction may also be referred to as the process or procedure implemented by the transaction, and may be arbitrarily defined according to the capabilities of the various applications available.

The status of a transaction may not be evident from the activity of a single constituent application; rather, the transaction may be a function of the activity of all relevant applications taken together with information regarding the process defining the transaction. For example, depending on the procedure defined in a given enterprise, processing of a purchase order may involve several steps. The purchase order may first be entered, such as through a dedicated application or email interface. Once entered, the identity and authority of the requester may be validated, such as by verifying that the requestor is an employee with the appropriate signature authority using a human resources application. Subsequently, financial approval may be obtained, which may include using a financial application to verify that the request falls within the budget of the individual or organization requesting the order. Depending on the results of these various steps and the complexity of the enterprise's policy, additional verifications such as management approvals may be obtained. When all requirements are satisfied, the order may be transmitted to a vendor, completing the purchase order transaction process.

Any of the applications functioning in support of a complex transaction may generate activity within storage system 150 as file system content is manipulated. File system content, including file data and/or metadata records corresponding to the activity, may be generated in response to such activity as described above. However, as previously noted, in some instances, the progress of a given transaction through its defined process may not be evident from the activity of a given application as reflected in the file system content corresponding to its activity. For example, a human resources application may reflect personnel data, but not budget data. Consequently, querying the human resources application may result in verification that a given individual has appropriate signature authority for a particular purchase, the result of which querying may be indicated in file system content. However, the human resources application may not be capable of determining whether sufficient budget exists for the purchase. In fact, in some instances any given application, such as the human resources application, may generally be unaware of a broader transactional context for its operation. That is, the application may be unable to distinguish whether a given query is or is not part of the process of a given transaction that may span multiple applications.

To configure each application that may potentially participate in a given transaction to be able to directly interact with other applications may be difficult or impractical. For example, if the functionality of one or more applications is fixed by an external supplier, it may not be possible to perform such configuration. In the embodiment illustrated in FIG. 2, storage system 150 includes content processing system 300, which in various embodiments may be configured to monitor file system content stored by storage management system 200, to generate additional metadata based on such monitoring, and to invoke an application in response to such monitoring. In some embodiments, content processing system 300 may be configured to coordinate or monitor complex transactions of which constituent applications may be unaware.

Figure 6:
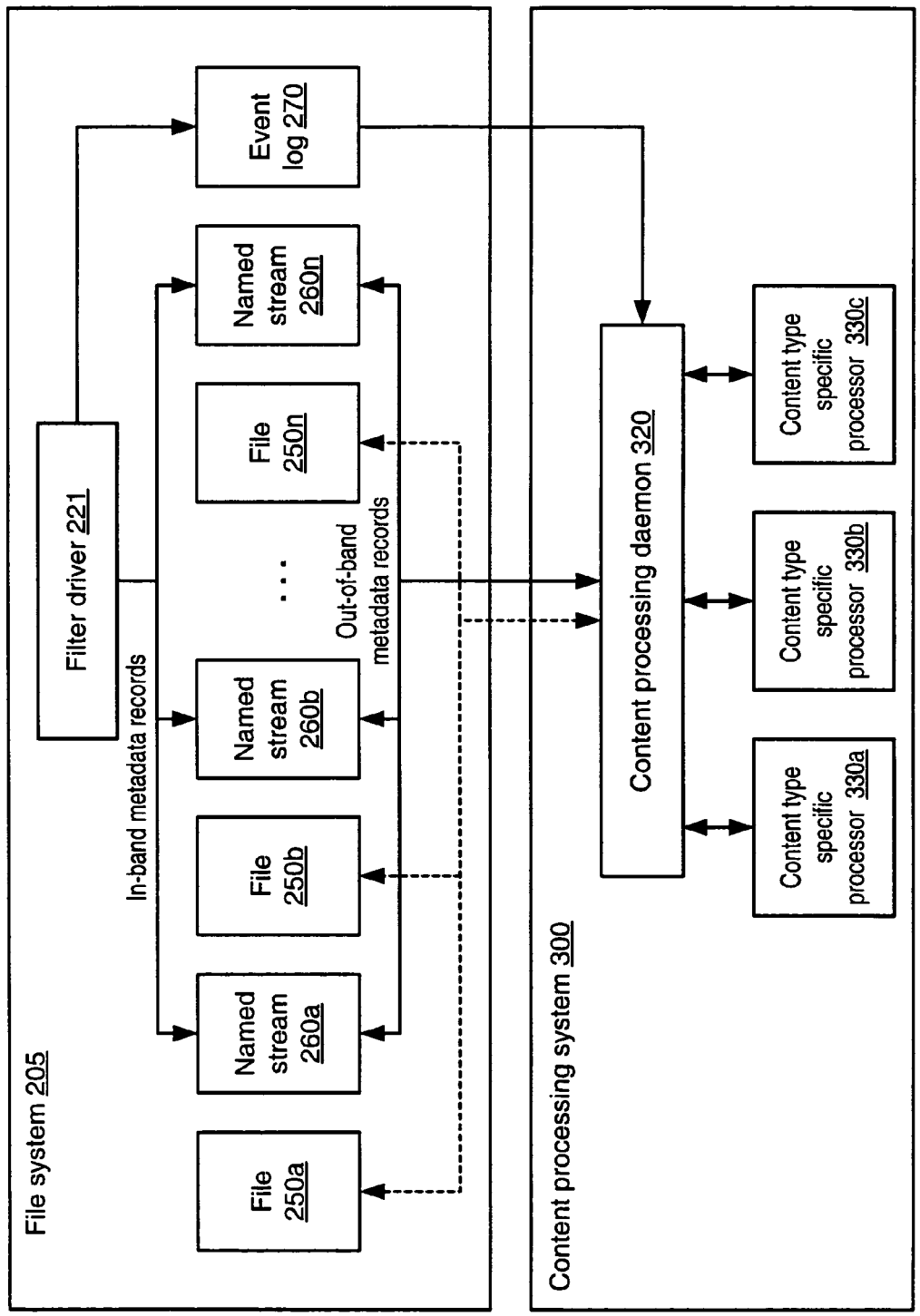
FIG. 6 is a block diagram illustrating one embodiment of a content processing system.

One embodiment of content processing system 300 is shown in FIG. 6. In the illustrated embodiment, content processing system 300 is shown along with the embodiment of file system 205 illustrated in FIG. 4. Content processing system 300 includes a content processing daemon 320 configured to interact with a plurality of content type specific processors 330a-c, which may also be referred to simply as content processors 330. Content processing daemon 320 is also configured to interact with files 250, named streams 260, and event log 270 of file system 205. Additionally, content processing daemon 320 may be configured to interact with a query system, such as query system 400, in embodiments of storage system 150 that include such a query system.

In the illustrated embodiment, content processing daemon 320 may be configured to perform out-of-band detection of operations and events that have been detected in-band and recorded by filter driver 221. For example, content processing daemon 320 may occasionally scan event log 270 to determine what file system content access events have occurred since the last scan. In response to detected events, content processing daemon 320 may generate additional file system content as described in greater detail below. In some embodiments, it is contemplated that content processing daemon 320 may scan files 250 and/or named streams 260 directly, while in other embodiments content processing daemon 320 may use event log 270 to access those files 250 and named streams 260 corresponding to recorded events. Additionally, it is contemplated that in some embodiments, content processing system 300 may include its own log of events updated in response to notification by filter driver 221, rather than using event log 270.

Content processing daemon 320 may interact with file system 205 to generate or modify file system content, including file data and metadata, on behalf of one or more content processors 330. In one embodiment, a content processor 330 may include procedural code or logic configured to monitor the defined process of a particular transaction. For example, a given content processor 330 may implement an algorithm or state machine that describes a sequence of operations defined as part of a particular transaction. A content processor 330 may also include identifying information for the file system content relevant to the transaction, such as particular files 250 that may be accessed during the course of the transaction. Additionally, a content processor 330 may include information to identify the specific applications corresponding to various operations. For example, if a given transaction includes a step to be performed by an accounting application, a corresponding content processor 330 may include the specific application identifying information, such as an application name or identifying code, that may be included in a metadata record generated by filter driver 221 for a given file 250 when that file is accessed by the accounting application.

In some embodiments, a given content processor 330 may be configured to process all instances of a particular transaction. For example, a content processor 330 configured to monitor the purchase order transactions described above may be configured to process all purchase order transactions that are in progress at a given time. In such embodiments, given content processor 330 may include data structures whereby individual transactions may be distinguished within the processor, such as by a timestamp or unique identifier. In other embodiments, each content processor 330 may correspond to a single instance of a given transaction. For example, when a new transaction is detected, a new instance of a content processor 330 may be spawned from an existing instance (such as a template) or from content processing daemon 320. It is contemplated that in some embodiments, content processors 330 and content processing daemon 320 may be implemented as a single processing entity, such as a single software module.

The operation of a given content processor 330 may be determined by the algorithm it implements in combination with file system content access event information received via content processing daemon 320. In one embodiment a content processor 330 may initially be in an inactive or idle state until triggered by a particular file system content access event. For example, in a system where a purchase order is initiated by emailing the purchase order to a particular email account, filter driver 221 may create a metadata record within event log 270 in response to appending the contents of a received purchase order to a file associated with the particular email account. Subsequently, content processing daemon 320 may detect the record and convey an indication of the record to a purchase order content processor 330, which may responsively activate. In an alternative embodiment, individual instances of content processors 330 may be spawned by content processor daemon 320 in response to detection of an appropriate activating event.

In one embodiment, a content processor 330 may be a passive monitor that functions to detect when a given sequence of events has transpired or a given state of file system content has occurred. For example, a content processor 330 may be configured to detect whether a sequence of events, such as the steps of an approval process, have been executed in the appropriate order by examining metadata records generated by filter driver 221 in response to application activity undertaken during the process. In another case, a content processor 330 may be configured to determine whether file system content is well-formed, according to a particular syntax or schema. For example, a content processor 330 may examine metadata records or file data following an update to determine whether it is syntactically correct, properly structured (i.e., required data is present), etc.

In another embodiment, a content processor 330 may be configured to actively modify file system content, and/or to invoke other applications in response to detecting various events or states of content. For example, in a document publishing environment, a given document may be made available to users in several different formats (e.g., Portable Document Format (PDF), HTML format, Microsoft Word format). In such an environment, a content processor 330 may be configured to automate the generation of necessary versions of a given document. For example, a content processor 330 may be configured to detect when a master version of a document in a given file 250 has been updated, by detecting a metadata record of an update to that file in named stream 260 and/or event log 270. Upon detecting the update, content processor 330 may invoke the appropriate generator or translator applications to convert the updated master version to each of the desired formats. Such conversion may occur transparently to the user or application updating the master document.

As another example, a content processor 330 may be configured to actively perform a complex transaction such as the purchase approval process described above. In such a case, the content processor 330 may be configured to invoke various applications as specified in the procedure corresponding to the transaction. For example, the content processor 330 may be configured to detect that a new purchase order request has been received via email as described above. The content processor 330 may then extract information from the request, such as the identity of the requester and the dollar amount of the request, by accessing a file 250 that stores the request data. Using the extracted information, the content processor 330 may interact with various applications to obtain approval as described above. For example, the content processor 330 may generate queries to verify signature authority within a human resources application, budget status within a financial application, etc. In instances where user interaction is required, content processor 330 may be configured to generate a prompt to be conveyed to a user for response, for example via email.

In various embodiments, content processors 330 may be configured to generate different forms of output. In one embodiment, a content processor 330 may generate an out-of-band metadata record in response to its processing. For example, a content processor 330 configured to perform schema validation of structured data in a given file 250 may generate a metadata record indicating the status of its check within the corresponding named stream 260. In other embodiments, content processors 330 may be configured to generate or modify file data instead of or in addition to metadata. For example, the aforementioned schema validator may be configured to correct certain defects detected while validating structured data, such as by truncating malformed records or filling in missing data fields. As another example, a content processor 330 may be configured to interact with a query engine to maintain the referential integrity of data indexed by the query engine, as described in greater detail below. In still other embodiments, content processors 330 may be configured to interact with applications or users. For example, as described above, a content processor 330 may be configured to invoke an application's API in response to detecting a particular event such as a document content update. It is contemplated that in one embodiment, one or more content processors 330 may be configured to generate metadata records in an extensible, self-describing data format such as described above, which may include a format compliant with any version of the XML format.

It is noted that while content processing system 300 and its various components may interact with applications that are processes 112 within application layer 100 as described above, content processing system 300 and its various components are distinct from applications. In general, particular applications may not be aware of the activity of other applications and may not have access to the metadata generated during the course of operation of file system 205. However, in the illustrated embodiment content processing system 300 does have access to such metadata, and by virtue of such access may be configured to detect transactional events not fully represented by the operation of a particular application.

Figure 7:
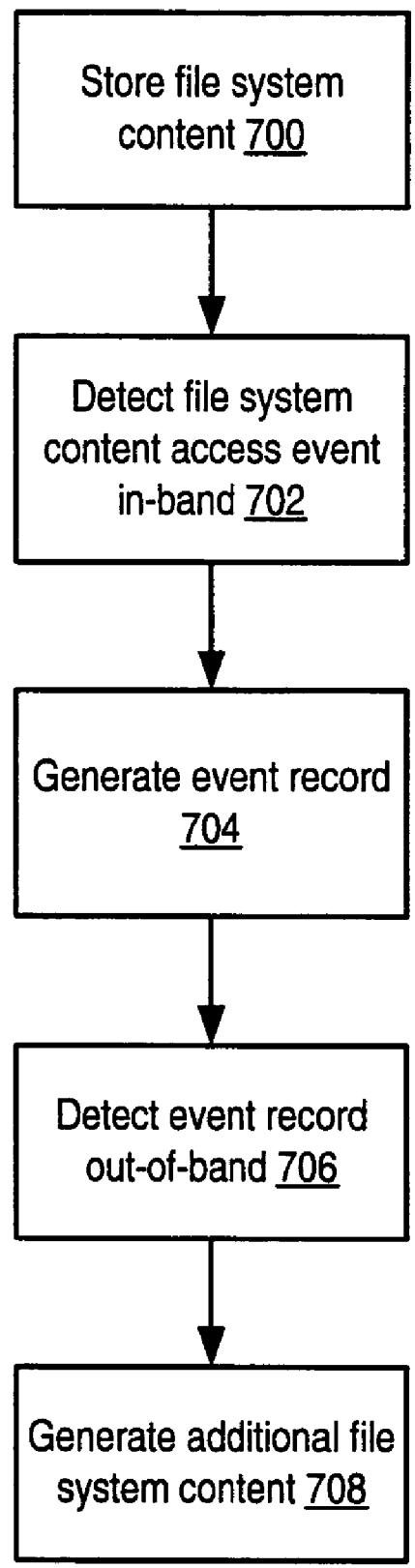
FIG. 7 is a flow diagram illustrating one embodiment of a method of operation of a storage system including a content processing system.

One embodiment of a method of operation of storage system 150 including content processing system 300 is illustrated in FIG. 7. Referring collectively to FIG. 1 through FIG. 4, FIG. 6 and FIG. 7, operation begins in block 700 where file system content, such as file data or metadata, is stored. In one embodiment, file system content may include both file data and metadata. Subsequent to storing file system content, a file system content access event is detected in-band (block 702). For example, the file system content access event may be detected in-band by filter driver 221 as described above. As noted above, in some embodiments the initial storing of file system content may itself be a detectable file system content access event. For example, a file create operation may be a file system content access event detectable in step 702.

In response to detection of the file system content access event, an event record is generated (block 704). For example, in one embodiment filter driver 221 may be configured to generate an event record including information about the file system content access event, such as the type of the event and the file system content accessed thereby. In one embodiment, such a record may be stored in event log 270. In some embodiments, a metadata record including additional information about the file system content access event may also be generated. For example, in one embodiment filter driver 221 may be configured to assemble various metadata elements pertinent to an operation to access a given file, such as the file identity, file ownership, the identity of the process generating the access event, etc. In one embodiment, the event record and/or any additional metadata records generated in response to event detection may be stored in an extensible, self-describing data format such as the XML format, as described previously.

After the event record has been generated, it may be detected out-of-band (block 706). For example, in one embodiment content processing daemon 320 or a content processor 330 may be configured to scan event log 270 to detect the event record. In some embodiments, detecting the event record may include detecting a transaction encompassing several applications. For example, a particular content processor 330 may detect that a given event record is indicative of an initial or continuing step in a particular type of transaction involving activity on the part of several applications.

In response to out-of-band event record detection, additional file system content is generated (block 708). In one embodiment, the additional file system content that is generated may include file data stored in one of more files 250, metadata records stored in one or more named streams 260, or both. In one embodiment, an application may additionally be invoked in response to out-of-band event record detection. For example, a given content processor 330 may invoke an application in the course of processing a transaction, as described above.

Querying File System Content

As described above, in some embodiments file system 205 may be configured to store various types of file system content. File system 205 may store numerous types of file data within one or more files, and may store metadata of arbitrary complexity corresponding to a given file. File system 205 may also be configured to consume file system content. For example, file system 205 may implement particular storage policies whereby files having certain usage characteristics as indicated in their metadata are assigned to particular types of storage. In one embodiment, for example, files that are more recently used or are accessed by certain types of processes may be assigned to faster types of storage, whereas other files may be assigned to slower storage.

In some embodiments, application or operating system processes external to file system 205 (such as processes 112 of FIG. 2) may also be configured to consume file system content. For example, a programmer writing an application software module may wish to create and manipulate specific files and their associated file data in order to store or retrieve application data. Additionally, such a programmer may wish to perform actions contingent on the metadata characteristics of certain files, such as configuring a backup program to select only files that have been modified since the time of the last backup. In some embodiments, specific file system content may be specified by querying file system content to identify content satisfying particular criteria. The available criteria for querying file system content may depend on the format in which file system content is stored. For example, in one embodiment file system content may be stored in a fixed, non-extensible format, such as a tabular data structure where a data item's description is inherited from row and column definitions rather than from a self-describing format tag. In such an embodiment the criteria by which file system content may be selected may be determined by the defined structure of the format, such as the available row and column definitions. In embodiments where file system content is stored in an extensible, self-describing format, such as the XML format described above, the criteria available for selecting desired file system content may include any of the self-describing features of that content.

Figure 8:
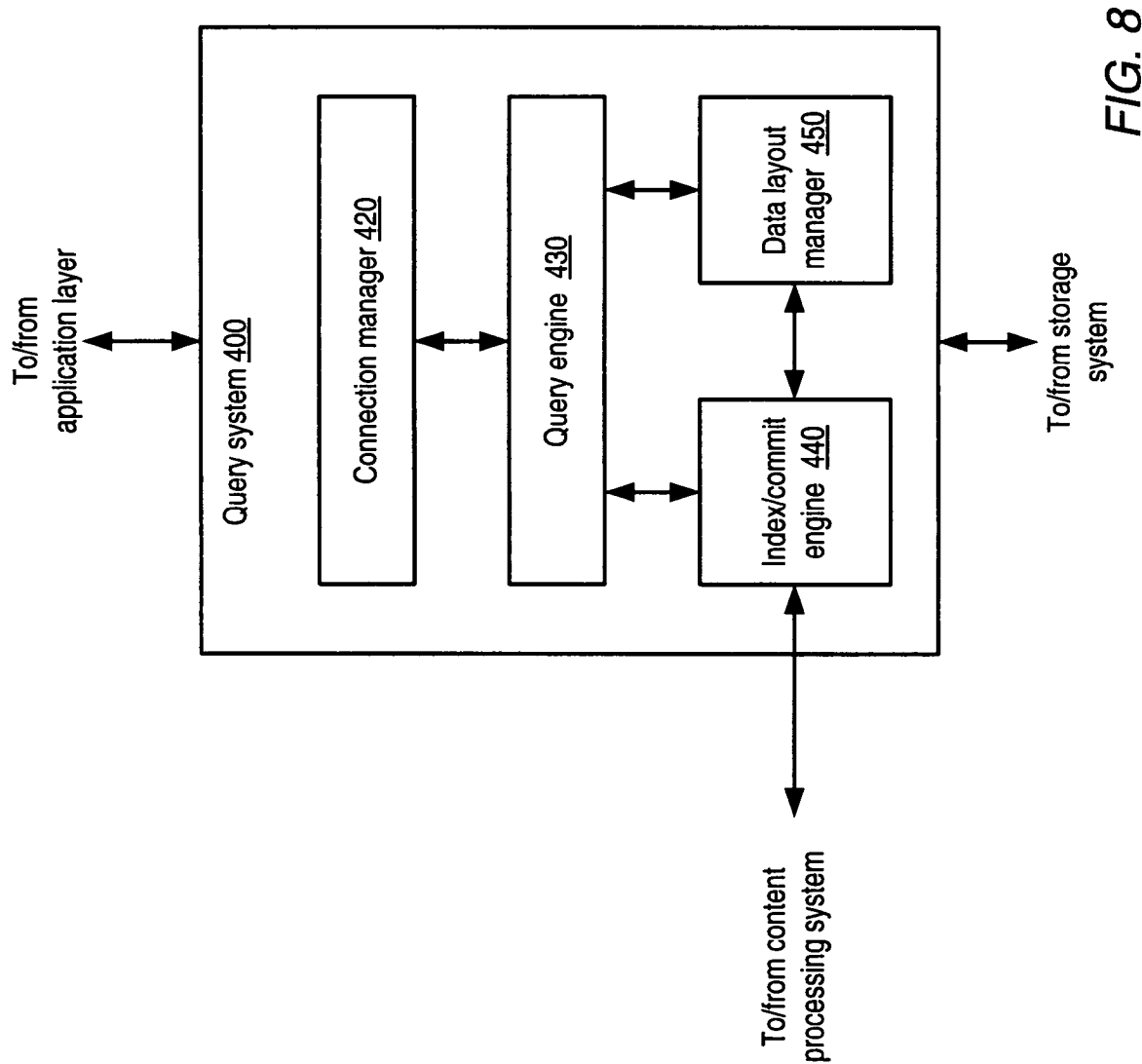
FIG. 8 is a block diagram illustrating one embodiment of a query system.

In the embodiment of storage system 150 illustrated in FIG. 2, query system 400 is configured to provide file system content query capabilities via API 114C to various processes 112. One detailed embodiment of query system 400 is illustrated in FIG. 8. In this embodiment, query system 400 includes a connection manager 420, a query engine 430, an index/commit engine 440, and a data layout manager 450, each described in greater detail below.

Generally speaking, a query may-specify how a subset of data is to be selected from a larger set of data, for example through the evaluation of one or more data fields of a record stored in a self-describing format. For example, a user may wish to select all stored records that correspond to the file /test1/foo.pdf for further analysis. Correspondingly, the user may construct a query that specifies the selection of all records having a data field tagged "path" where the data field equals a particular value, such as "/test1/foo.pdf". In some embodiments, it is contemplated that the entirety of file system content may be queried, including file data stored within files 250 as well as metadata stored within named streams 260, whether generated in-band, e.g., by filter driver 221, or out-of-band, e.g., by a particular content processor 330, or whether the metadata is defined and/or generated externally to file system 205, e.g. by an application process 112 via API 114 as previously mentioned. Additionally, in some embodiments where file system content access events are recorded within event log 270 as described above, it is contemplated that those recorded events may also be queried.

Queries may be constructed in a query language, which may provide syntactic constructs for the selection of sets of data based on the value of one or more tagged data fields. In some embodiments, a given query language may support procedural features, such as functions, for example, in addition to set-selection features. Further, in some embodiments a given query language may support the embedding within a query of procedural routines coded in other programming languages, such as Java or C, for example. Where the XML format is used to structure file system content, a given application may construct a query to select particular file system content in the XML Query (XQuery) language as specified by the World Wide Web Consortium (W3C) or any future XQuery standard or variant thereof. However, it is contemplated that any suitable query language may be employed.

As noted previously, in the illustrated embodiment a process 112 may generate a query and convey it to query system 400 through API 114. In some embodiments, query system 400 may be configured to support several processes 112 having concurrent queries outstanding at a given time. Further, in some embodiments a querying process 112 may submit its query from a remote computer system via a network. Additionally, a querying process 112 may need to authenticated in some embodiments, for example to restrict access to query system 400. In one embodiment, connection manager 420 may be configured to manage the overhead of establishing and maintaining connections between querying processes 112 and query system 400. For example, connection manager 420 may be configured to provide an authentication interface (such as a username and password interface) whereby querying processes 112 may establish their authority to perform queries. Additionally, in one embodiment connection manager 420 may be configured to maintain any information necessary to support connection-based or session-based semantics for querying processes 112. For example, connection manager 420 may maintain data structures to map queries in progress to their relevant requestors, such that query results are directed to the correct querying process 112. In some embodiments, connection manager 420 may also be configured to perform load balancing of query requests, for example by distributing requests among multiple instances of query engine 430 to improve overall query throughput.

In one embodiment, query engine 430 may be configured to parse and evaluate queries submitted to query system 400 via connection manager 420. For example, query engine 430 may receive a query requesting the names of all files 250 having been modified by a particular user within a certain range of time. Query engine 430 may parse the query for syntactic correctness, and may return an error condition if the query is malformed. In some embodiments, query engine 430 may also perform structural transformations to the query, for example to decompose the query into multiple queries and/or to optimize the query for performance. Next, query engine 430 may examine metadata records stored in named streams 260 to identify files 250 meeting the specified criteria, returning the names of those files to the querying process 112. Numerous implementations of query engine 430 configured for parsing and evaluating queries are possible and contemplated.

In some embodiments, query engine 430 may interact directly with storage management system 200 to access file system content in response to evaluation of a query. However, in some instances, query evaluation performance may be improved by creating one or more indexes of file system content and using these indexes to assist in query evaluation. In the illustrated embodiment, index/commit engine 440 may be configured to generate and maintain these indexes, and to provide index information to query engine 430 during the evaluation of queries.

Generally speaking, an index may be any data structure that organizes a collection of data according to some aspect or attribute, facilitating querying of the data by the indexed aspect or attribute. For example, in one embodiment an index may be a list of names of all files 250 defined with file system 205, organized alphabetically. In some embodiments, multiple indexes of file system content may be employed. For example, if file system content is frequently queried by name, associated user, and content creation/modification time, individual indexes that sort or organize file system content by each of these attributes may be created. In some embodiments, more complex indexing schemes may be employed, including indexes that combine multiple content attributes into complex state spaces. Additionally, it is contemplated that indexes may be implemented using any suitable data structure, including lists, tables, trees, and higher-order data structures.

The indexes created by index/commit engine 440 may themselves be stored within file system 205. In some embodiments, these indexes may be stored separately from other file system content. In such embodiments, data layout manager 450 may be configured to track the location of indexes within file system 205. In one embodiment, data layout manager 450 may be configured to bypass filter driver 221 while accessing storage associated with indexes, such that in-band metadata corresponding to index accesses is not generated. In such an embodiment, certain inconsistency scenarios involving indexing and metadata may be avoided. For example, if an index/commit engine 440 were to attempt to include metadata of a given index, such as a modification timestamp, within the given index and then to write the given index to storage through filter driver 221, the metadata of the given index following the write might no longer be consistent with the contents of the given index, e.g., if filter driver 221 created a new modification timestamp in response to the write operation.

In some embodiments, a querying process 112 may use a query to modify file system content via query system 400. For example, a query may be used to select a set of data items, such as files 250, from among the available file system content. The selected data items may then be modified, but instead of submitting the modifications directly to file system 205 to be propagated to storage devices 230, query system 400 may coordinate the data updates, thereby presenting an alternate path for file system content modification. However, in embodiments where multiple paths for modifying file system content exist, coordination among these paths may be necessary to prevent conflicting modifications to common data. In one embodiment, index/commit engine 440 may be configured to implement a commit protocol (such as a two-phase commit, for example) to ensure that updates to file system content are consistent.

The indexes maintained by index/commit engine 440 may generally be derivative of file system content, such that when file system content changes (whether due to an update via query system 400, due to activity of a content processor 300, or from a process 112 directly interacting with file system 205), one or more indexes corresponding to the modified content may no longer accurately reflect the new state of the content. For example, if index/commit engine 440 includes an index of file system content by file name, and a given file 250 is renamed by a process 112, the file name-based index may be stale following the renaming. Generally speaking, if an index is current with respect to the state of the indexed data, the index may be said to preserve referential integrity with respect to the indexed data.

If indexed file system content changes, index/commit engine 440 may be configured to preserve referential integrity of its indexes by updating relevant indexes to reflect the changes. In one embodiment, index/commit engine 440 may be configured to coordinate with content processing daemon 320 or a particular content processor 330 within content processing system 300 to detect file system content changes and to update indexes correspondingly. For example, in one embodiment content processing daemon 320 may be configured to detect when any change to file system content has occurred, such as by scanning event log 270. In response to detecting a file system content access event that may result in a change in content (for example, an event resulting in creation, modification, or deletion of file system content), content processing daemon 320 may be configured to notify index/commit engine 440 of the detected event. In response, index/commit engine 440 may update one or more indexes affected by the detected event to maintain their referential integrity. For example, if a particular file 250 is deleted, content processing daemon 320 may detect an event record corresponding to the deletion within event log 270 and notify index/commit engine 440 of the event and the deleted file 250. Index/commit engine 440 may then modify the indexes it maintains to remove references to the deleted file 250.

In another embodiment, one or more specific content processors 330 may be configured to monitor file system content corresponding to particular indexes maintained by index/commit engine 440. For example, in one embodiment index/commit engine 440 may inform a given content processor 330 of the structure and content of a particular index, such as the self-describing data fields relevant to the index (e.g., file name, file size, file signature, etc.) and their current values. Content processor 330 may then be configured to monitor file system content access events for events pertinent to the structure and content of the particular index, and may notify index/commit engine 440 of only those pertinent events. When so notified, index/commit engine 440 may update the relevant index to preserve its referential integrity, for example by adding or removing information from the index.

Figure 9:
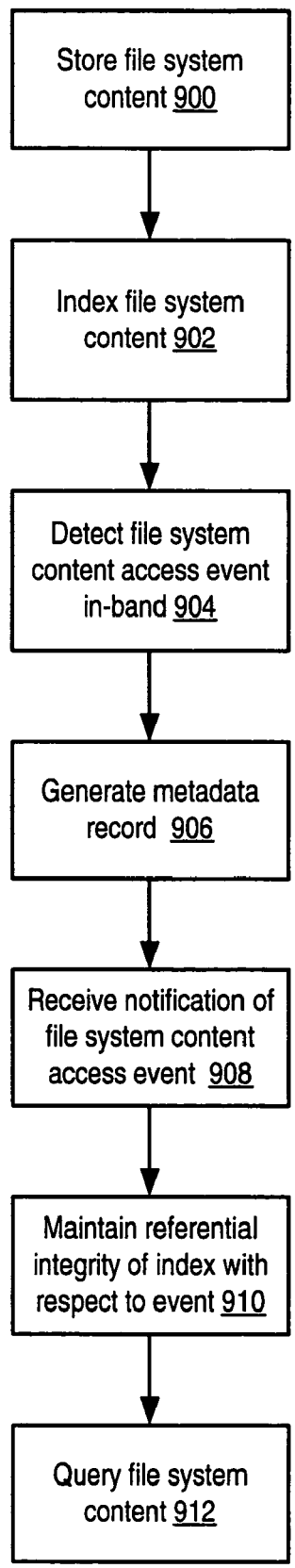
FIG. 9 is a flow diagram illustrating one embodiment of a method of operation of a storage system including a query system.

One embodiment of a method of operation of storage system 150 including query system 400 is illustrated in FIG. 9. Referring collectively to FIG. 1 through FIG. 4, FIG. 8 and FIG. 9, operation begins in block 900 where file system content, such as file data or metadata, is stored. In one embodiment, file system content may include both file data and metadata. In some embodiments, query system 400 may be configured to generate one or more indexes of file system content as described above (block 902), although in other embodiments this step may be omitted.

Subsequent to storing file system content, a file system content access event is detected in-band (block 904). For example, the file system content access event may be detected in-band by filter driver 221 as described above. As noted above, in some embodiments the initial storing of file system content may itself be a detectable file system content access event. For example, a file create operation may be a file system content access event detectable in step 902.

In response to detection of the file system content access event, a metadata record is generated (block 906). For example, in one embodiment filter driver 221 may be configured to generate a metadata record including information relevant to the event or the file system content being accessed, such as a timestamp, file signature, identity of the process generating the event, etc. In one embodiment, such a record may be stored in a particular named stream 260. Also, in some embodiments an event record may be generated in response to event detection. Such an event record may be stored in event log 270, for example. In one embodiment, the metadata record and/or the event record generated in response to event detection may be stored in an extensible, self-describing data format such as the XML format, as described previously.

In embodiments where file system content is indexed, notification of the file system content access event may be received (block 908) and referential integrity of a relevant index may be maintained with respect to the file system content access event (block 910). For example, content processing daemon 320 may be configured to notify index/commit engine 440 of all file system content access events, or a particular content processor 330 may be configured to monitor those events pertinent to the indexes maintained by index/commit engine 440, as described above. In response to receiving notification of a pertinent event, index/commit engine 440 may be configured to update the relevant index to maintain its referential integrity, as described above. It is contemplated that these steps may be omitted in embodiments that do not employ indexing.

Subsequent to generation of the metadata record, file system content may be queried (block 912). For example, query system 400 may be configured to respond to a query submitted by a process 112 by querying file data and/or metadata. In embodiments where file system content is stored in the XML format, the query may be generated in XML Query (XQuery format).

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a storage device configured to store file system content including a plurality of files;
   a host device configured to implement a file system, wherein the file system is configured to manage access to said storage device and to store file system content on said storage device, wherein said file system is further configured to perform in-band detection of file system content access events and to responsively generate respective metadata records indicative of said file system content access events; and
   a query system configured to evaluate a query specifying one or more conditions for selecting one or more of said respective metadata records, wherein said query is formulated in a query language.

2. The system as recited in claim 1, wherein said query system is further configured to query file data stored in one or more of said plurality of files.

3. The system as recited in claim 1, wherein said file system is further configured to generate respective event records in response to said in-band detection of said file system content access events, and wherein said query further specifies one or more conditions for selecting one or more of said respective event records.

4. The system as recited in claim 1, further comprising a content processing daemon configured to notify said query system of said file system content access events, in response to which said query system is further configured to maintain referential integrity of an index of said file system content with respect to said file system content access events.

5. The system as recited in claim 1, wherein at least some of said metadata records are stored in an extensible, self-describing data format.

6. The system as recited in claim 5, wherein said extensible, self-describing data format is compliant with a version of the Extensible Markup Language (XML) format.

7. The system as recited in claim 1, wherein said query language comprises a version of XML Query (XQuery) language.

8. A method, comprising:
   a file system storing file system content including a plurality of files on a storage device, wherein said file system is implemented by a host device and is configured to manage access to said storage device;
   said file system performing in-band detection of file system content access events;
   in response to performing said in-band detection, said file system generating a respective metadata records indicative of said file system content access events; and
   a query system evaluating a query specifying one or more conditions for selecting one or more of said respective metadata records, wherein said query is formulated in a query language.

9. The method as recited in claim 8, further comprising said query system querying file data stored in one or more of said plurality of files.

10. The method as recited in claim 8, further comprising:
    said file system generating respective event records in response to said in-band detection of said file system content access events, wherein said query further specifies one or more conditions for selecting one or more of said respective event records.

11. The method as recited in claim 8, further comprising:
    said query system maintaining an index of said file system content;
    said query system receiving notification of said file system content access events;
    in response to receiving said notification, said query system maintaining referential integrity of said index with respect to said file system content access events.

12. The method as recited in claim 8, wherein at least some of said metadata records are stored in an extensible, self-describing data format.

13. The method as recited in claim 12, wherein said extensible, self-describing data format is compliant with a version of the Extensible Markup Language (XML) format.

14. The method as recited in claim 8, wherein said query language comprises a version of XML Query (XQuery) language.

15. A tangible, computer-accessible storage medium comprising program instructions, wherein the program instructions are executable to implement:
    a file system storing file system content including a plurality of files on a storage device, wherein said file system is configured to manage access to said storage device;
    said file system performing in-band detection of file system content access events;
    in response to performing said in-band detection, said file system generating respective metadata records indicative of said file system content access events; and
    a query system evaluating a query specifying one or more conditions for selecting one or more of said respective metadata records, wherein said query is formulated in a query language.

16. The computer-accessible storage medium as recited in claim 15, wherein the program instructions are further executable to implement said query system querying file data stored in one or more of said plurality of files.

17. The computer-accessible storage medium as recited in claim 15, wherein the program instructions are further executable to implement:
    said file system generating respective event records in response to said in-band detection of said file system content access events, wherein said query further specifies one or more conditions for selecting one or more of said respective event records.

18. The computer-accessible storage medium as recited in claim 15, wherein the program instructions are further executable to implement:
    said query system maintaining an index of said file system content;
    said query system receive notification of said file system content access events;
    in response to receiving said notification, said query system maintaining referential integrity of said index with respect to said file system content access events.

19. The computer-accessible storage medium as recited in claim 15, wherein at least some of said metadata records are stored in an extensible, self-describing data format.

20. The computer-accessible storage medium as recited in claim 19, wherein said extensible, self-describing data format is compliant with a version of the Extensible Markup Language (XML) format.

21. The computer-accessible storage medium as recited in claim 15, wherein said query language comprises a version of XML Query (XQuery) language.

* * * * *